UNITED STATES PATENT OFFICE.

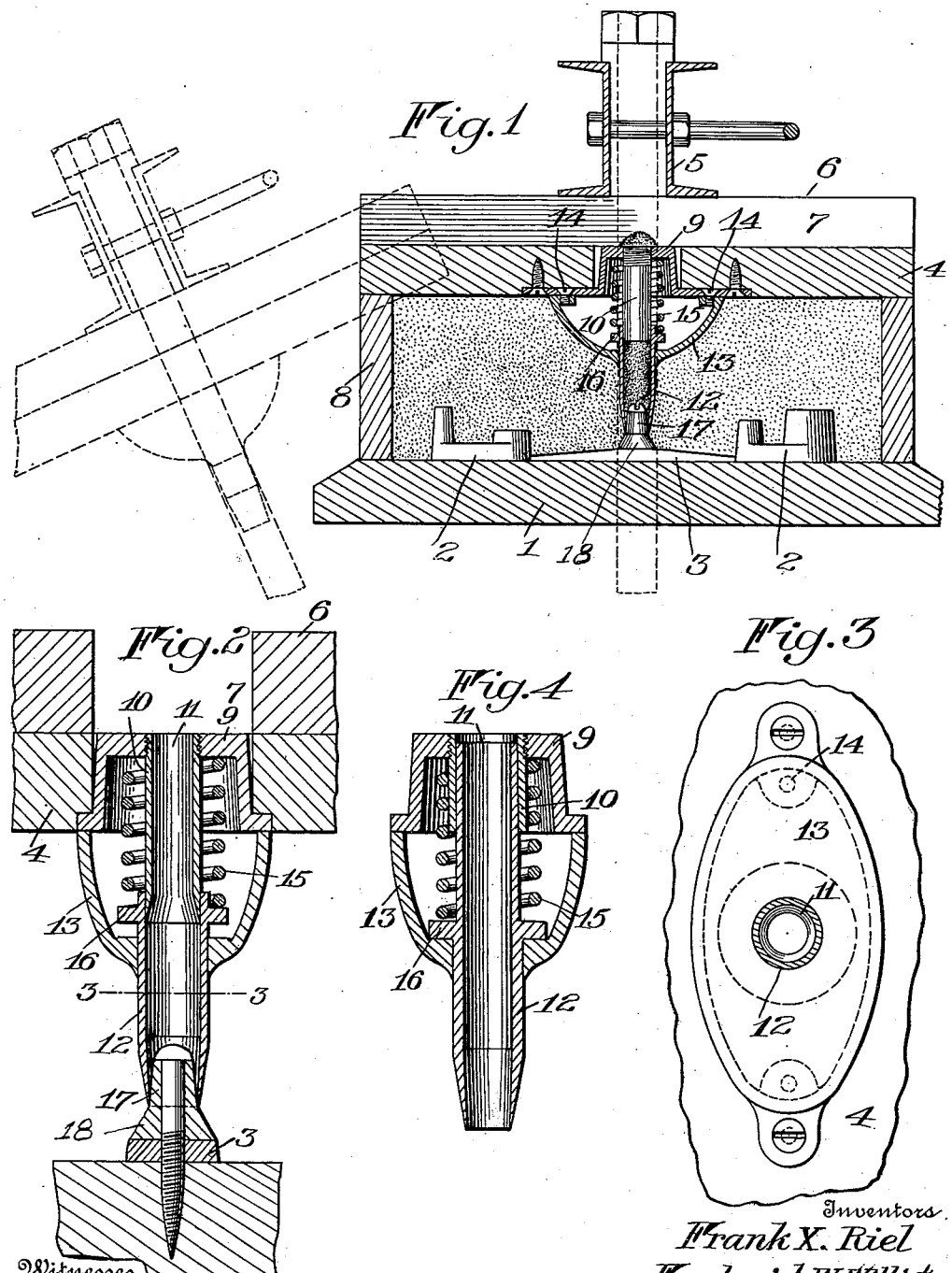

FRANK X. RIEL AND FREDERICK W. WILLISTON, OF ROCHESTER, NEW YORK.

SPRUE-CUTTER.

1,095,356.      Specification of Letters Patent.      Patented May 5, 1914.

Application filed January 5, 1914. Serial No. 810,286.

*To all whom it may concern:*

Be it known that we, FRANK X. RIEL and FREDERICK W. WILLISTON, of Rochester, in the county of Monroe and State of New York, have invented certain new and useful Improvements in Sprue-Cutters; and we do hereby declare the following to be a full, clear, and exact description of the same, reference being had to the accompanying drawings, forming a part of this specification, and to the reference-numerals marked thereon.

Our present invention relates to molding, and more particularly to molding machines in which the sand is compressed or packed about the patterns, and it has for its object to provide a simple, cheap and convenient device for cutting the sprue or ingate opening through which the metal is admitted to the impressions or molds left by the patterns.

A further object of the invention is to provide a device of this nature that will be substantially automatic in its operation, and so mounted in connection with the mold squeezing machine that the sprue will be cut with the one operation of forming the mold.

To these and other ends the invention consists in certain improvements and combinations of parts all as will be hereinafter more fully described, the novel features being pointed out in the claims at the end of the specification.

In the drawings: Figure 1 is a transverse vertical section through the compression elements of a molding machine provided with a sprue cutter constructed in accordance with and illustrating one embodiment of our invention; Fig. 2 is an enlarged detail section through the sprue cutter alone taken at right angles to the plane of Fig. 1; Fig. 3 is a bottom plan view of the upper portion of the cutting device with the cutter tube in horizontal section, and Fig. 4 is a view corresponding to Fig. 2 of a slightly modified construction.

Similar reference numerals in the several figures indicate the same parts.

The machine to which we have, in the present instance, shown our cutter connected is illustrated only in part and need be but briefly described, as it is of a well known type, and it may be here said that those skilled in the art will readily understand the application of our invention to molds or flasks of other types than the simple one which, for convenience, is illustrated herein. In this view the machine comprises a pattern table or lower compression member 1 upon which the patterns 2 connected by a gate 3 are mounted. An upper compression member or board 4 is arranged above the table on a yoke shaped head 5, to which it is preferably connected by spaced cleats 6 forming a transverse channel 7 between them, and this head, together with the board, may be swung laterally to an inoperative position at one side, as shown in dotted lines in Fig. 1. The pattern table 1 reciprocates vertically, being usually driven by pneumatic elevating means (not shown) beneath it.

In the operation of forming a mold, the flask 8 is placed on the pattern board 1 to surround the patterns, and filled with sand, while the head 5 is swung over to the side, and the table is in a lowered position. The head is then brought into a vertical position and the table elevated so that the flask, or rather the contents thereof, is squeezed between the upper and lower members 1 and 4. The machine is then opened and the flask removed to make way for another one, and it is at this point that it has heretofore been usual to cut the ingate or sprue opening with a suitable hand tool. This hand method of sprue cutting is objectionable, not only because of the time it takes but because, the mold being unsupported, it is difficult to cut a clean hole. In the practice of our invention therefore we cut the sprue simultaneously with the squeezing operation, as before stated, so that the mold leaves the machine complete and ready for pouring. To these ends we provide on the upper compression member 4 a bushing 9 that extends therethrough, and that has a central opening in which is secured a guide tube 10 that provides an opening or channel 11 through the member from side to side. Slidable telescopically on this guide tube 10 is a tubular cutter 12 that is also guided in a laterally flared or tapered shell 13 secured to the bushing 9 at 14, and so conformed as to mold a suitably shaped pour opening. A coil spring 15 housed within the shell 13 and the bushing encircles the guide and cutter tubes 11 and 12, and engages the bushing or support at one end while at its other end it acts against a collar or lateral abutment 16 on the cutter, so that its tendency is to project the cutter and render the latter yieldingly retractable within its supporting shell.

The abutment also acts as a stop to limit the degree of projection, and it will be noticed that the increased depth given by the bushing permits the use of a relatively long spring.

When the guide tube 10 is on the inside, as shown in Figs. 1, 2 and 3, its lower end is brought to an edge or tapered, though when it is on the outside, as shown in Fig. 4, which form we prefer, this is not necessary, but in either case the lower end of the cutter tube 12 is brought to a cutting edge and choked or restricted, as clearly shown in Figs. 2 and 4, so that its extremity in the region of the cutting edge is of smaller diameter, on the inner side particularly, than the upper portions. These features are designed to promote a free passage of a column of sand upwardly through the continuous channel formed jointly by the cutter and its guide tube.

On the lower compression member or pattern table 1 is arranged an upstanding projection or button 17 mounted near or preferably on the gate 3 in alinement with the cutter tube 12 so that as the two compression members move together the cutting end of the cutter tube 12 will engage over the button in the manner shown in Figs. 1 and 2, and complete its cut against it at the lower tapered portion 18 below the portion that enters the tube.

The operation of the device will be obvious from the foregoing description. As the lower compression member or table 1 rises to squeeze the mold the cutter 12 is pressed through the sand, as is the shell 13, until the former engages the button 17. The latter pushes the column of sand upwardly through the channel 11 within the tube, and with successive operations this sand emerges on top of the board 4 and passes off through the lateral channel 7 between the cleats 6, being thrown to the floor when the head is rocked back to the dotted line position, or it may be scraped off as required. When the compression members are separated to release the flask the cutter is withdrawn from the sand, leaving a clean sprue hole, a pour opening, and the gate and pattern impressions all connected together for the passage of the metal.

The yielding nature of the cutter 12 not only limits the pressure exerted thereby against the button 17, whereby damage to and wearing of these parts is much reduced, but it permits the one cutter to be used upon molds or flasks of different depths, as will be readily appreciated. Furthermore if the cutter strikes an obstruction, or for any reason happens to be out of register with the button, it will yield and prevent any damage being done.

We claim as our invention:

1. In a sprue forming device, the combination with a supporting member, of a tubular cutter projecting therefrom at one side and a spring interposed between the supporting member and cutter to render the latter yielding, the device being provided with a continuous outlet channel extending from the outer end of the cutter to the opposite side of the support for the escape of the column of sand.

2. In a sprue forming device, the combination with a supporting member having an opening extending therethrough, of a tubular cutter guided therein in alinement with the opening and constituting a continuous outlet channel in conjunction therewith, and a spring interposed between the support and cutter.

3. In a sprue forming device, the combination with a supporting member of flared shape adapted to mold the pour opening, of a tubular cutter projecting therefrom at one side, and a spring housed within the supporting member to act between the latter and the cutter to render the cutter yielding, the device being provided with a continuous outlet channel extending from the outer end of the cutter to the opposite side of the support for the escape of the column of sand.

4. In a sprue forming device, the combination with a supporting member having a guide tube thereon open at both ends and providing an opening or channel therethrough, of a tubular cutter also open at both ends to permit the passage therethrough of a column of sand and telescopically engaging the guide tube to constitute a continuation of the opening or channel through the supporting member.

5. In a sprue forming device, the combination with a supporting member having a guide tube thereon providing an opening or channel therethrough, of a tubular cutter telescopically engaging the guide tube and constituting a continuation of the opening or channel, said cutter being provided with an exteriorly arranged abutment, and a spring encircling the guide tube and acting at one end against the support and at the other against the abutment on the cutter to render the latter yielding.

6. In a sprue forming device, the combination with a molding apparatus comprising two opposed compression members adapted to receive a flask between them, one of said members being provided with an opening or channel extending therethrough from side to side, of a tubular cutter carried by the last mentioned member in alinement with the opening or channel and forming a continuation thereof, and a spring interposed between the cutter and its carrying member to provide a yielding contact on the part of the cutter with the other member.

7. In a sprue forming device, the combination with a molding apparatus comprising two opposed compression members adapted to receive a flask between them one of said members being provided with an opening or channel extending therethrough from side to side, of a tubular cutter carried by the last mentioned member in alinement with the opening or channel and forming a continuation thereof, said cutter being movable toward and from the other compression member, and a centering projection on the latter over which the cutter engages and which is adapted to force the column of sand through the beforementioned channel.

8. In a sprue forming device, the combination with a molding apparatus comprising upper and lower compression members adapted to receive a flask between them, the upper member being provided with a vertical opening or channel extending therethrough from side to side and with a transverse channel on its top intersecting the first mentioned channel, of a tubular cutter carried by the upper member in alinement with the vertical opening and forming a continuation thereof, said cutter being movable toward and from the lower member, and a centering projection on the latter over which the cutter engages and which is adapted to force the column of sand through the cutter.

FRANK X. RIEL.
FREDERICK W. WILLISTON.

Witnesses:
RUSSELL B. GRIFFITH,
H. E. STONEBRAKER.

Copies of this patent may be obtained for five cents each, by addressing the "Commissioner of Patents, Washington, D. C."